(12) United States Patent
Grinko (10) Patent No.: US 12,128,491 B2
(45) Date of Patent: Oct. 29, 2024

(54) METHOD FOR GRINDING A GEAR WHEEL BY MEANS OF A WORM GRINDING WHEEL, AND A DRESSING ROLL FOR DRESSING THE WORM GRINDING WHEEL

(71) Applicant: KAPP NILES GMBH & CO. KG, Coburg (DE)

(72) Inventor: Sergiy Grinko, Coburg (DE)

(73) Assignee: KAPP NILES GMBH & CO. KG, Coburg (DE)

( * ) Notice: Subject to any disclaimer, the term of this patent is extended or adjusted under 35 U.S.C. 154(b) by 444 days.

(21) Appl. No.: 17/627,283

(22) PCT Filed: Jul. 2, 2020

(86) PCT No.: PCT/EP2020/068633
§ 371 (c)(1),
(2) Date: Jan. 14, 2022

(87) PCT Pub. No.: WO2021/008882
PCT Pub. Date: Jan. 21, 2021

(65) Prior Publication Data
US 2022/0258261 A1 Aug. 18, 2022

(30) Foreign Application Priority Data
Jul. 17, 2019 (DE) ..................... 10 2019 119 441.5

(51) Int. Cl.
*B23F 1/02* (2006.01)
*B23F 21/02* (2006.01)
*B23F 23/12* (2006.01)
(52) U.S. Cl.
CPC ............ *B23F 1/023* (2013.01); *B23F 21/026* (2013.01); *B23F 23/1231* (2013.01)

(58) Field of Classification Search
CPC .......... B23F 1/02; B23F 1/023; B23F 21/026; B23F 21/02; B23F 23/1231; B23F 5/02; B23F 5/04; B24B 53/075; B23P 15/14
(Continued)

(56) References Cited

U.S. PATENT DOCUMENTS

| 8,926,403 B2 | 1/2015 | Mueller |
| 10,569,349 B2 | 2/2020 | Wuerfel |
| 11,278,976 B2 * | 3/2022 | Hoener ................... B23P 15/14 |

FOREIGN PATENT DOCUMENTS

| DE | 102011115526 A1 | 4/2013 |
| DE | 102014009868 A1 | 1/2016 |

(Continued)

*Primary Examiner* — Eric J Rosen
*Assistant Examiner* — Robert C Moore
(74) *Attorney, Agent, or Firm* — LUCAS & MERCANTI, LLP; Klaus P. Stoffel (57) ABSTRACT

A method for grinding a gear wheel by a worm grinding wheel in a grinding machine, wherein the tooth flanks of the gear wheel are ground by the abrasive flanks of the profiling of the worm grinding wheel. In order to increase the productivity of the grinding, the method includes the following steps: a) calculating the engagement ratios between the abrasive flanks of the profiling of the worm grinding wheel and the tooth flanks of the gear wheel, wherein the size of the profile forming zone is determined; b) determining a geometry modified in respect of the geometry determined according to step a) such that the profile forming zone is minimal; c) profiling the worm grinding wheel with the geometry which has thus resulted; d) grinding the gear wheel by the worm grinding wheel profiled according to step c).

8 Claims, 4 Drawing Sheets

(58) Field of Classification Search
USPC .......................................................... 451/28
See application file for complete search history.

(56) References Cited

FOREIGN PATENT DOCUMENTS

| | | |
|---|---|---|
| DE | 102016005257 A1 | 11/2017 |
| EP | 0278512 A1 | 8/1988 |
| EP | 2848348 A2 | 3/2015 |
| GB | 666122 A | 3/1952 |

\* cited by examiner

METHOD FOR GRINDING A GEAR WHEEL BY MEANS OF A WORM GRINDING WHEEL, AND A DRESSING ROLL FOR DRESSING THE WORM GRINDING WHEEL

CROSS-REFERENCE TO RELATED APPLICATIONS

The present application is a 371 of International application PCT/EP2020/068633, filed Jul. 2, 2020, which claims priority of DE 10 2019 119 441.5 filed Jul. 17, 2019, the priority of these applications is hereby claimed and the applications are incorporated herein by reference.

BACKGROUND OF THE INVENTION

The invention relates to a method for grinding a gear wheel by means of a worm grinding worm in a grinding machine, wherein the tooth flanks of the gear wheel are ground with the abrasive flanks of the profiling of the grinding worm, wherein the gear wheel has an axis of rotation, wherein the grinding worm has an axis of rotation, and wherein the toothing of the gear wheel to be ground has a base circle diameter, a root circle diameter and a tip circle diameter.

In the mass or large-scale production of gears, and especially in their hard fine machining, dressable grinding worms are frequently used as grinding tools. The grinding worm is usually dressed by means of a diamond roller in order to shape the gear profile to be ground in the grinding worm. Furthermore, the use of the diamond roller is necessary to regenerate the worn profile after grinding a number of workpieces. In this process, the angle of action of the dressing roll is usually made equal to the angle of action of the gearing to be machined. In addition, it is usually checked whether the usable root circle or root form circle of the gearing is reliably reached by the correspondingly dressed grinding worm. If this is not the case, the angle of action of the dressing roll is modified accordingly. In addition, the angle of action of the grinding worm has an influence on the so-called profile formation zone (i.e. on the minimum width of the grinding worm required to form the full toothing profile). The size of the profile formation zone significantly influences the productivity of the entire machining process.

SUMMARY OF THE INVENTION

The invention is based on the object of further developing a process of the type mentioned above in such a way that it is possible to carry out grinding with as small a profile formation zone as possible, for which purpose the geometry of the engagement between the gearing to be ground and the grinding worm is specifically changed. This should make it possible to increase the productivity of the grinding operation by increasing the number of parts to be ground between two dressing operations.

The solution of this object by the invention provides that the method comprises the steps:
a) Calculation of the engagement ratios between the abrasive flanks of the profiling of the grinding worm and the tooth flanks of the gear wheel when the gear wheel and the grinding worm are engaged for grinding, wherein a section is considered along a plane which includes the axis of rotation of the grinding worm and which is perpendicular to the axis of rotation of the gear wheel; said calculation comprising:
   a1) Determination of a first line of engagement resulting from the contact points between two successive abrasive flanks and two successive tooth flanks;
   a2) Determination of a second line of engagement resulting from the contact points between two successive abrasive flanks opposite the abrasive flanks and two successive tooth flanks opposite the tooth flanks;
   a3) Determination of the intersection point of the first and second lines of engagement;
   a4) Determination of a line passing through the intersection point and tangent to the base circle diameter of the toothing of the gear wheel;
   a5) Determination of the intersection point of the line with the root circle diameter and determination of the intersection point of the line with the tip circle diameter;
   a6) Determination of the line that results as the intersection of the plane with a second plane that contains the axis of rotation of the gear wheel, that is perpendicular to the plane and that contains the intersection of the first and second lines of engagement;
   a7) Determination of the distance between the intersection point of the line with the root circle diameter and the line of the intersection line of the planes;
   a8) Determination of the distance between the intersection point of the line with the tip circle diameter and the line of the intersection line of the planes;
b) Determination of a changed geometry compared to the one determined according to step a) in such a way that the distances are equal;
c) Profiling of the grinding worm with the geometry that results when the distances are equal (or at least largely equal);
d) Grinding of the gear wheel with the grinding worm profiled according to step c).

Figure 4:
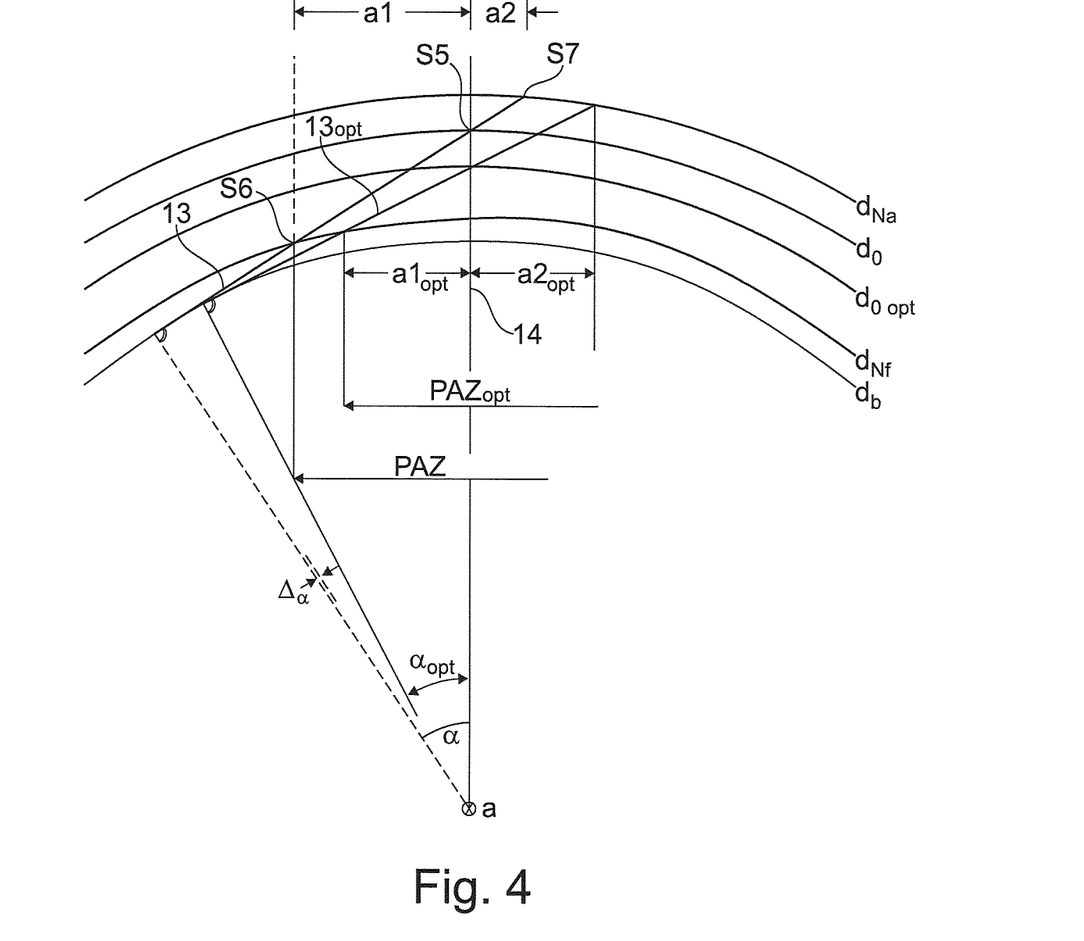
FIG. 4 shows schematically the geometric relationships of the engagement between the gearing and the grinding worm, illustrating the change from the prior art to the solution according to the invention.

This calculation is preferably performed analytically on the basis of the geometric relationships of the gearing (see the description of the example, in particular according to FIG. 4).

With regard to step b) above, according to another, namely iterative numerical embodiment of the invention, the sub-steps are provided:
   b1) Recalculating the engagement ratios according to step a), changing the position of the lines through the intersection point and tangential to the base circle diameter (by making a change in the angle $\alpha$, which exists between the line as the intersection of the planes and the perpendicular to the line through the point of intersection and tangential to the base circle diameter, by a given angular difference $\Delta\alpha$), determining the distances and comparing the determined distances with each other;
   b2) Repeating of step b1) with incrementally changed position of the line until the distances are equal.

When carrying out step b2) above, the position of the line can be changed stepwise between an initial value and a final value, and then the geometry is determined in which the distances have the smallest deviation from each other. When carrying out the above step b2), the position of the lines can be changed step by step by a predetermined angle change for this purpose.

The root circle diameter is thereby preferably the usable root circle diameter and the tip circle diameter is preferably the usable tip circle diameter.

However, it is also possible that the root circle diameter is the form circle root diameter and the tip circle diameter is the form circle tip diameter.

A special embodiment of the invention provides for modifications to be made to the profiling of the grinding worm after step b) above has been carried out and before step c) above has been carried out. The background to this measure is that there are toothing cases in which the explained optimization is not possible because either the form root circle or the usable root circle is not reached by the grinding worm as a result of an unfavorable toothing geometry or the root rounding radius cannot be completely formed in the toothing. This is where the aforementioned modification step is advantageously used, according to which the initially calculated optimum angle of action on the grinding worm is calculated back iteratively or analytically before profiling the grinding worm until the aforementioned restrictions no longer exist. The new angle of action on the grinding worm determined in this way is then no longer optimal in the sense of the adjustment of the engagement lines explained, but is nevertheless more favorable than with a nominal angle of action (from which the original calculation was based). In this way, higher productivity is achieved in any case.

The profiling of the grinding worm can thereby be carried out according to above step c) by manufacturing a worm steel base body and covering it with a layer of abrasive material.

Alternatively and preferably, however, it is provided that the profiling of the grinding worm is carried out according to step c) above by providing a dressable grinding worm with the geometry. According to one possibility, a dressing roll corresponding to the geometry can be produced for the profiling of the grinding worm, with which the grinding worm is dressed; alternatively, it is also possible that the profiling of the grinding worm is carried out with a numerically controlled dressing device, which produces the geometry of the abrasive flanks of the grinding worm.

The invention also includes a dressing roll for dressing a grinding worm made according to the above process.

Accordingly, the invention provides that the engagement conditions between the workpiece to be ground, i.e. the gearing, and the grinding worm are specifically modified. This adaptation is carried out by analyzing the geometry of the gearing during engagement, i.e. contact, between the grinding tool and the gearing. This contact generally takes place via the engagement lines, which run in the normal direction to the involute tooth flank and to the worm surface (abrasive flanks of the profiling of the grinding worm). The engagement lines of the left and right flanks cross at the pitch diameter and thus form tip and root meshing zones, which are strongly dependent on the (given) profile displacement of the gearing. A projection of the engagement zones forms the profile formation zone (see FIG. 4), which is responsible for the formation of the entire toothing profile.

Since the profile modification factor is usually not equal to zero, the tip and root portions of the contact sections differ from each other. The profile formation zone is always defined by the larger proportions. In an optimum case aimed at according to the invention, in which the proportions are equal, the profile formation zone assumes the smallest possible value. This optimum case is achieved according to the invention if the angle of action of the grinding worm is specifically defined in such a way that the engagement zones of the left and right flanks are "shifted" towards each other and the tip and root portions are thus equalized.

Accordingly, it is envisaged that the engagement relationship between the abrasive flanks of the profiling of the grinding worm and the tooth flanks of the gear are first calculated, whereby the size of the initially present profile formation zone is determined.

A modified geometry is then determined in which the above-mentioned distances (a1 and a2) become equal. This geometry is then used as the basis for the manufacturing process.

The determination of the modified geometry can be done analytically (starting from step a above) by considering the corresponding geometric relations and from this determining the situation (see FIG. 4 described in more detail below) where the mentioned requirement of equal distances (a1=a2) is given.

However, it is also possible to determine the geometry numerically (iteratively) with the above-mentioned requirement of equal distances: Then the engagement ratios are recalculated, whereby the geometry is changed and the size of the profile formation zone is determined again. This calculation step is then repeated with incrementally changed geometry until the profile formation zone is minimal. Profiling of the grinding worm then takes place with the geometry that has thus resulted (i.e. with minimum profile formation zone). The gear is ground accordingly with the grinding worm profiled in this way.

With such a defined profile formation zone, the highest productivity of the machining process can be achieved.

The proposed procedure thus results in an optimization or reduction of the contact line between the workpiece and the tool.

Thus, by using the grinding worm when grinding the gearing, the generating grinding process is used.

The proposed process thus allows better tool utilization and, in particular, a minimized profile formation zone by selectively modifying the generation geometry of the grinding worm.

BRIEF DESCRIPTION OF THE DRAWING

An example of an embodiment of the invention is shown in the drawings.

DETAILED DESCRIPTION OF THE INVENTION

Figure 1:
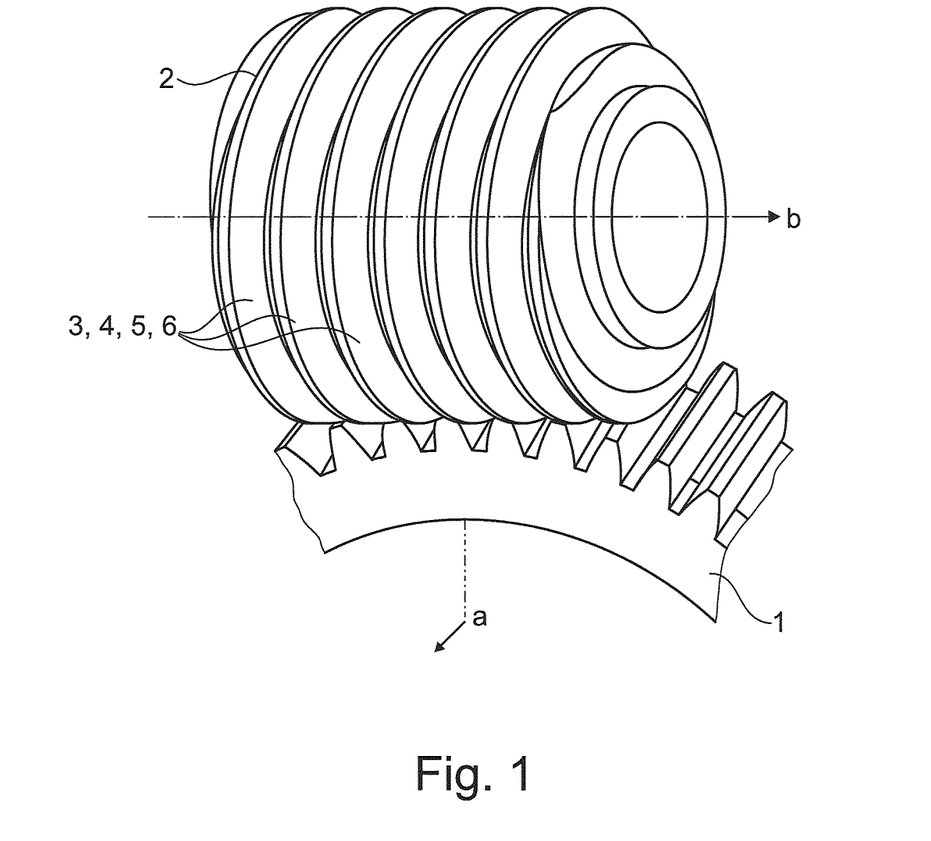
FIG. 1 shows a perspective view of a gear wheel that is being hard-fine machined with a grinding worm.

FIG. 1 first illustrates the basic procedure for grinding the teeth of a gear wheel 1 with a grinding worm 2. The gear wheel 1 rotates about the axis of rotation a, and at the same time the grinding worm 2 rotates about the axis of rotation b with a given mesh between the gear wheel 1 and the grinding worm 2. The abrasive flanks 3, 4, 5, 6 of the grinding worm 2 wear off an allowance located on the tooth flanks of the toothing of the gear 1.

The profiling of the abrasive flanks 3, 4, 5, 6 of the grinding worm 2 is carried out according to the method described below.

Figure 2:
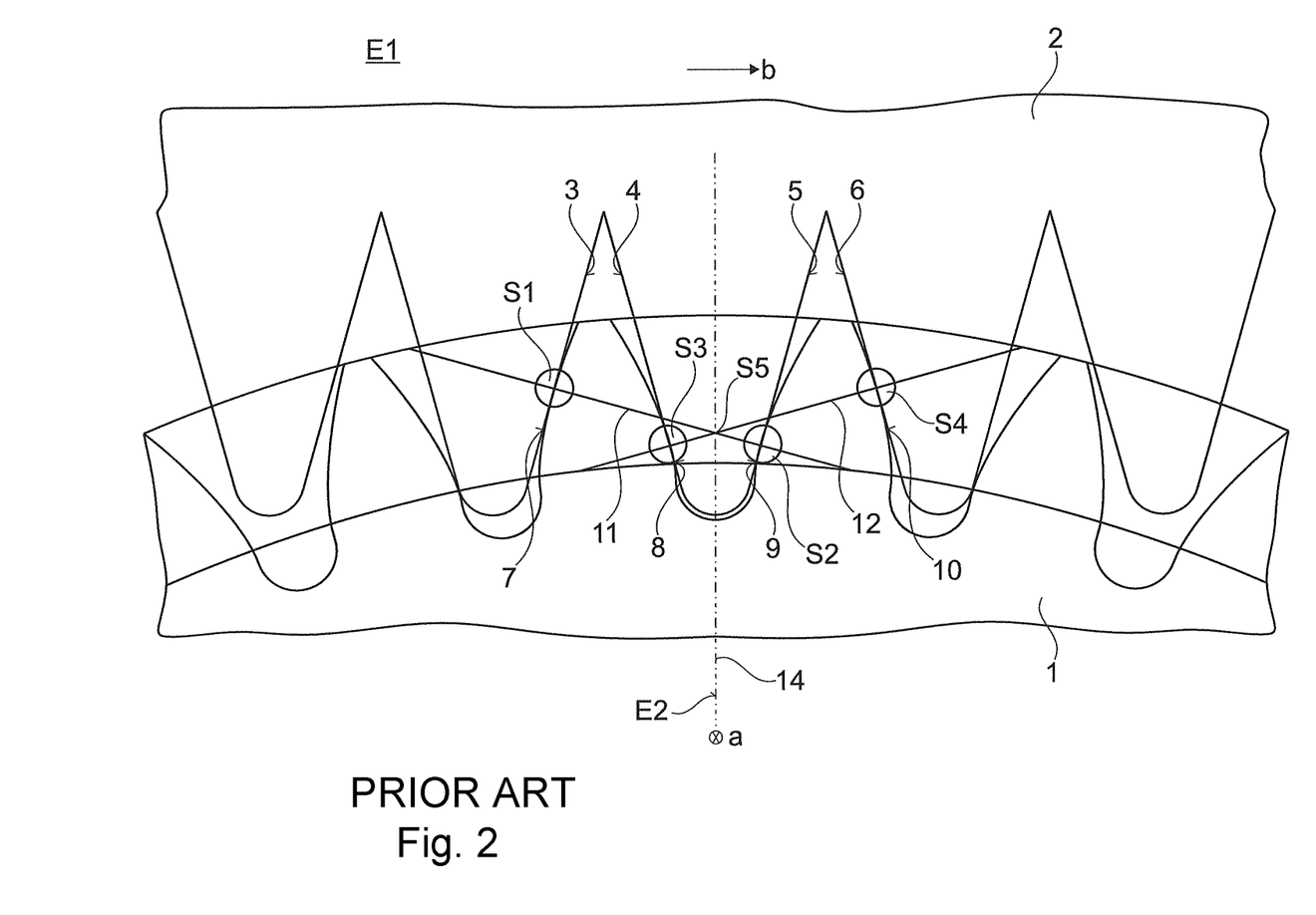
FIG. 2 shows schematically the engagement relationships between the gear teeth and the grinding worm according to the state of the art.
Figure 3:
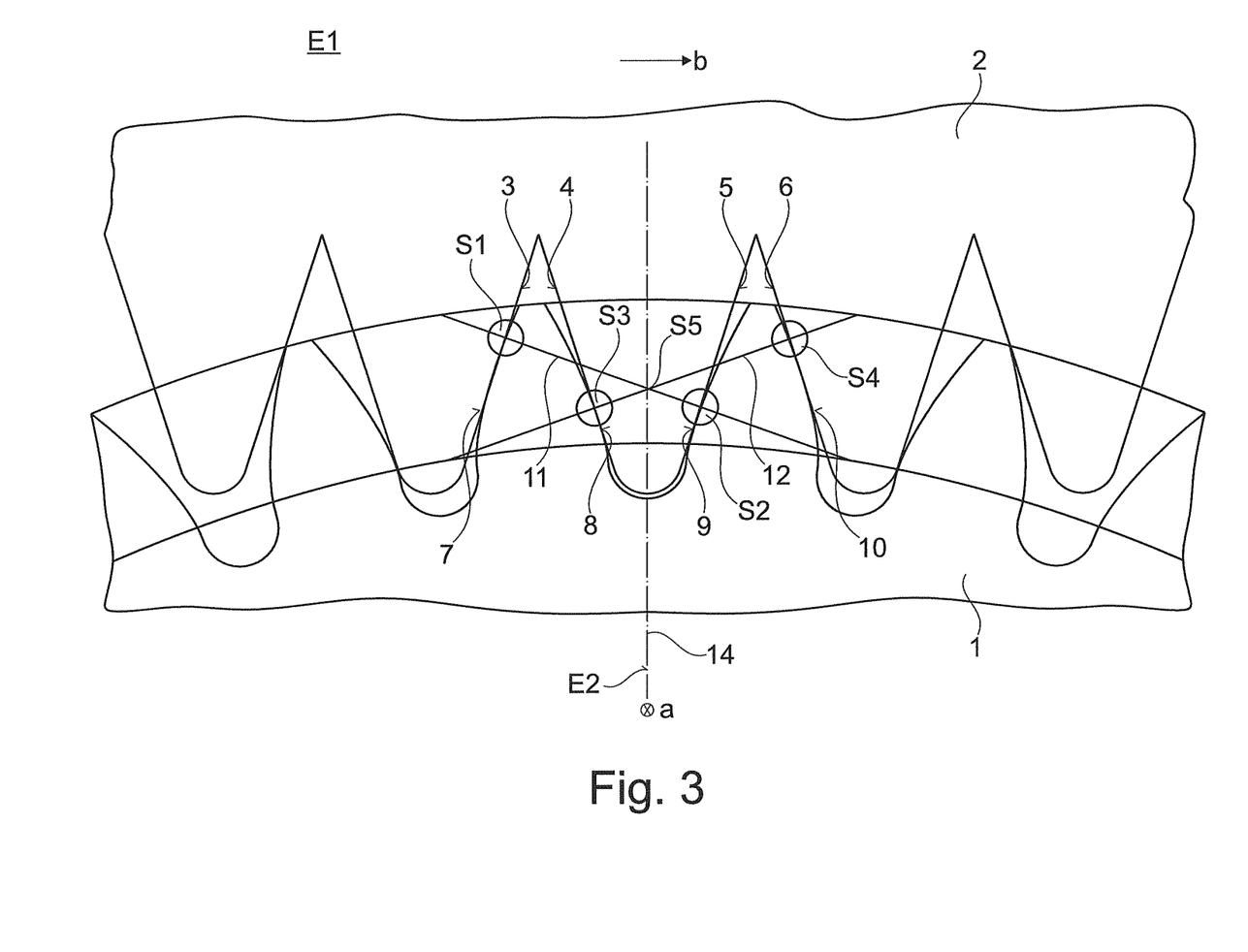
FIG. 3 shows schematically the engagement relationships between the gear teeth and the grinding worm in an embodiment according to the invention.

To this end, the usual prior art procedure is first shown in FIG. 2:

The gear wheel 1 is in engagement with the grinding worm 2, and in particular the tooth flanks 7, 8, 9, 10 of the gear wheel 1 to be ground are in engagement with the abrasive flanks 3, 4, 5, 6 of the grinding worm 2. Shown in FIG. 2 (as well as in FIG. 3) is a section which is obtained along a plane E1 which contains the axis of rotation b of the grinding worm 2 and which is perpendicular to the axis of rotation a of the gear wheel 1. Perpendicular to the drawing plane in FIGS. 2 and 3 is a second plane E2, which contains the axis of rotation a of gear 1 and which is perpendicular to plane E1.

Contact points S1 and S2 with the abrasive flanks 3 and 5 of the grinding worm 2 result in engagement for two successive tooth flanks 7 and 9 of the gear wheel 1. Correspondingly, contact points S3 and S4 result on the mating flanks, namely between the tooth flanks 8 and 10 with the abrasive flanks 4 and 6.

A first line of engagement 11 can be defined by the contact points S1 and S2, and a second line of engagement 12 can also be defined by the contact points S3 and S4. Their intersection point S5 provides the pitch diameter $d_0$ of the toothing of the gear wheel 1 (see FIG. 4). A line 14 can be drawn through this intersection point S5, which results from the intersection of the two planes E1 and E2.

According to the state of the art, the grinding worm 2 is profiled for the resulting engagement situation as shown in FIG. 2. For example, a diamond dressing roll is manufactured which corresponds to the geometry of the gear wheel 1 to be ground and which then produces the profile of the abrasive flanks 3, 4, 5, 6 in engagement with the grinding worm 2.

Referring to FIG. 4, it can be seen that a tangent line passing through the intersection point S5 can be applied to the base circle diameter $d_b$ of the gear teeth of gear wheel 1; this line is designated 13.

The line 13 intersects the usable root circle diameter $d_{Nf}$ of the gear teeth of gear wheel 1 at an intersection point S6; likewise, the line 13 intersects the tip usable pitch circle diameter dNa of the gear teeth of gear wheel 1 at an intersection point S7.

The intersection points S6 and S7 determined in this way allow distances a1 and a2 to be determined, measured from the line 14.

As can be seen from FIG. 4 and as it is also reflected in FIG. 2, the tip engagement distance (area of the line 13 between the intersection point S5 and the intersection point S7) and the root engagement distance (area of the line 13 between the intersection point S5 and the intersection point S6) are of different sizes. FIG. 2 thus shows the usual machining situation without any change in the engagement ratios on the grinding worm; the root and tip portions of the engagement between the workpiece and the tool are clearly different.

The profile formation zone PAZ is twice the larger of the two distances a1 and a2, i.e. twice the distance a1 in the case of the situation shown in FIG. 4.

FIG. 4 illustrates the method according to the invention for moving from the explained meshing situation between gear wheel 1 and grinding worm 2 to an improved situation (the numerical iterative procedure is described here (using the angle difference $\Delta\alpha$), in which the calculation is performed with a changed position of the line 13 in each case; this represents an alternative to a direct determination of the desired final geometry):

As can be seen, the perpendicular to the line 13 (line through the intersection point S5 and tangential to the base circle diameter $d_b$) runs through the axis of rotation a of the gear wheel 1. The perpendicular thereby encloses an angle $\alpha$ with the line 14.

After the situation according to FIG. 2 has been calculated, the calculation is now repeated step by step, changing the angle $\alpha$; namely, it is changed by a given angle difference $\Delta\alpha$ and it is determined for the new situation thus resulting how the size ratio of the distances a1 and a2 changes.

The calculation is continued until the condition is reached, which is shown in FIG. 1 and in which the two distances a1 and a2 are equal: $a1_{opt}=a2_{opt}$. For this situation, the root and tip portions of the engagement are equal. This situation corresponds to FIG. 3, where the resulting ratios are sketched.

In the optimum case, where the two distances a1 and a2 are equal, the result is a minimum and thus optimum profile formation zone $PAZ_{opt}$, as shown in FIG. 4; this is twice the now equal distances $a1_{opt}$ and $a2_{opt}$.

Since the $PAZ_{opt}$ profile formation zone is now minimized, only a smaller axial section of the grinding worm is required for machining the workpiece. This means that more workpieces can be machined between two dressing operations for the same axial worm length. The productivity of the process is increased accordingly.

The calculation described above (see FIG. 4) was based on the usable root circle diameter $d_{Nf}$ and the usable tip circle diameter $d_{Na}$. However, it is also possible to base the calculation on the form circle root diameter $d_{Ff}$ and the form circle tip diameter $d_{Fa}$. These diameters lie a bit lower or higher than the two useable circles. Depending on which diameter is available as data input, these can be used in the calculation.

It should be noted that in the process steps a1) and a2) described above, the lines of engagement are determined as they result from the contact points between the gear wheel and the tool for two successive tooth flanks. However, the number of simultaneous contact points between tool and tooth flanks varies depending on the gear parameters.

The lines of engagement determined in accordance with steps a1) and a2) ultimately correspond to line 13, since this line is tangent to the base circle of the gearing (which is ultimately the definition of the line of engagement). However, the line 13 was introduced as an independent element, since it is the line that is varied in the further course of the calculation.

As mentioned above, there are gearing cases where the explained optimization (i.e. ultimately the change made to the engagement angle) is not possible, because either
1. the form root circle or usable root circle is not reached by the grinding worm due to an unfavorable toothing geometry or
2. the root rounding radius cannot be completely formed in the toothing.

In such cases, the calculated optimum pressure angle (with $a1_{opt}=a2_{opt}$) at the grinding worm must be recalculated iteratively or analytically after performing the described calculation (according to step a) and step b) of claim 1) and before profiling the grinding worm (according to step c) of claim 1) until the mentioned limitations (1. and/or 2.) no longer exist. The new pressure angle at the grinding worm determined in this way is then no longer optimal in the sense of the explained adjustment of the lines of action (with $a1_{opt}=a2_{opt}$), but nevertheless more favorable than with nominal pressure angle (from which the original calculation started). In any case, an increase in productivity is also achieved in this way.

The following should also be noted: The "root circle diameter" is sometimes defined as the diameter at which the lowest point of the gear tooth gap is located. The same applies to the "tip circle diameter", which frequently indicates or designates the highest point of the gear tooth gap. In the case of the present invention, however, the terms "root diameter" and "tip diameter" are to be understood as the diameter at which the involute starts or ends.

LIST OF REFERENCES

1 Gear wheel (workpiece)
2 Grinding worm (Grinding tool)
3 Abrasive flank of the profiling of the grinding worm
4 Abrasive flank of the profiling of the grinding worm
5 Abrasive flank of the profiling of the grinding worm
6 Abrasive flank of the profiling of the grinding worm
7 Tooth flank of the gear wheel
8 Tooth flank of the gear wheel
9 Tooth flank of the gear wheel
10 Tooth flank of the gear wheel
11 First line of engagement
12 Second line of engagement
13 Line through the intersection point S5 and tangential to the base diameter
14 Line of the intersection line pf the planes E1 and E2
a Axis of rotation of the gear wheel
b Axis of rotation of the grinding worm
$d_b$ Base circle diameter of the toothing of the gear wheel
$d_f$ Root circle diameter of the toothing of the gear wheel
$d_a$ Tip circle diameter of the toothing of the gear wheel
$d_{Nf}$ Usable root circle diameter of the toothing of the gear wheel
$d_{Na}$ Usable tip circle diameter of the toothing of the gear wheel
$d_{Ff}$ Form circle root diameter of the toothing of the gear wheel
$d_{Fa}$ Form circle tip diameter of the toothing of the gear wheel
$d_0$ Pitch circle diameter of the toothing of the gear wheel
E1 Plane (contains axis of rotation b of the grinding worm, perpendicular to the axis of rotation a of the gear wheel)
E2 Plane (contains axis of rotation a of the gear wheel, perpendicular to plane E1 and contains intersection point S5)
S1 Contact point
S2 Contact point
S3 Contact point
S4 Contact point
S5 Intersection point of the first and the second line of engagement
S6 Intersection point of the line (13) with the usable root diameter
S7 Intersection point of the line (13) with the usable tip diameter
a1 Distance between the intersection point S6 and the line 14
a2 Distance between the intersection point S7 and the line 14
PAZ Profile formation zone
α Angle
Δα Angle difference

The invention claimed is:

1. A method for grinding a gear wheel by means of a worm grinding worm in a grinding machine, wherein the tooth flanks of the gear wheel are ground with the abrasive flanks of the profiling of the grinding worm, wherein the gear wheel has an axis of rotation, wherein the grinding worm has an axis of rotation, and wherein a toothing of the gear wheel to be ground has a base circle diameter, a root circle diameter and a tip circle diameter, wherein the method comprises the steps of:

a) Calculation of engagement ratios between the abrasive flanks of the profiling of the grinding worm and the tooth flanks of the gear wheel when the gear wheel and the grinding worm are engaged for grinding, wherein a section is regarded along a plane which includes the axis of rotation of the grinding worm and which is perpendicular to the axis of rotation of the gear wheel; said calculation comprising:

a1) Determination of a first line of engagement resulting from contact points between a first two successive abrasive flanks and a first two successive tooth flanks;

a2) Determination of a second line of engagement resulting from contact points between a second two successive abrasive flanks opposite the first two successive abrasive flanks and a second successive tooth flanks opposite the first two successive tooth flanks;

a3) Determination of an intersection point of the first and second lines of engagement;

a4) Determination of a line passing through the intersection point and tangent to the base circle diameter of the toothing of the gear wheel;

a5) Determination of an intersection point of the line with the root circle diameter and determination of an intersection point of the line with the tip circle diameter;

a6) Determination of a line that results at an intersection of the plane with a second plane that contains the axis of rotation of the gear wheel, that is perpendicular to the plane and that contains the intersection of the first and second lines of engagement;

a7) Determination of a first distance between the intersection point of the line with the root circle diameter and the line at the intersection of the planes;

a8) Determination of a second distance between the intersection point of the line with the tip circle diameter and the line at the intersection of the planes;

b) Determination of a geometry obtained with changed engagement ratios compared to a geometry of the engagement ratios determined according to step a) by changing the position of the line which is tangent to the base circle diameter of the toothing of the gear wheel in such a way that the first and second distances are equal;

c) Profiling of the grinding worm with the changed geometry of the engagement ratios that results when the first and second distances are equal;

d) Grinding of the gear wheel with the grinding worm profiled according to step c).

2. The method according to claim 1, wherein the root circle diameter is the effective root circle diameter and the tip circle diameter is the usable tip circle diameter.

3. The method according to claim 1, wherein the root circle diameter is the circle root diameter of the toothing of the gear wheel and the tip circle diameter is the circle tip diameter of the toothing of the gear wheel.

4. The method according to claim 1, wherein modifications for profiling the grinding worm are made after carrying out step b) and before carrying out step c).

5. The method according to claim 1, wherein the profiling of the grinding worm is carried out according to step c) by manufacturing a worm steel base body and covering it with a layer of abrasive material.

6. The method according to claim 1, wherein the grinding worm is a dressable grinding worm.

7. The method according to claim 6, wherein for the profiling of the grinding worm a dressing roller is produced which corresponds to the changed geometry of step b) and with which the grinding worm is dressed.

8. The method according to claim 6, wherein the profiling of the grinding worm is carried out with a numerically controlled dressing device which produces the changed geometry of step b) of the abrasive flanks of the grinding worm.

* * * * *